(12) United States Patent
Arambepola et al.

(10) Patent No.: US 8,938,041 B2
(45) Date of Patent: Jan. 20, 2015

(54) TECHNIQUES FOR MANAGING INTERFERENCE IN MULTIPLE CHANNEL COMMUNICATIONS SYSTEM

(71) Applicant: Intel Corporation, Santa Clara, CA (US)

(72) Inventors: Bernard Arambepola, Enfield (GB); Thushara Hewavithana, Borehamwood (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/718,812

(22) Filed: Dec. 18, 2012

(65) Prior Publication Data

US 2014/0169431 A1 Jun. 19, 2014

(51) Int. Cl.
*H04B 1/10* (2006.01)

(52) U.S. Cl.
CPC .................................. *H04B 1/1027* (2013.01)
USPC ........................................................ 375/350

(58) Field of Classification Search
CPC .................................................... H04B 1/0092
USPC ........................................................ 375/350
See application file for complete search history.

(56) References Cited

U.S. PATENT DOCUMENTS

| 5,086,340 | A | 2/1992 | Citta et al. |
| 5,162,900 | A | 11/1992 | Citta |
| 5,778,310 | A | 7/1998 | Tong et al. |
| 5,995,565 | A | 11/1999 | Tong et al. |
| 6,421,077 | B1 | 7/2002 | Reed, Jr. |
| 7,697,645 | B2 | 4/2010 | Jong |
| 8,005,306 | B2 * | 8/2011 | Kimura .......................... 382/233 |
| 2002/0034337 | A1 * | 3/2002 | Shekter .......................... 382/275 |
| 2006/0226337 | A1 * | 10/2006 | Lim et al. .................... 250/208.1 |
| 2007/0116371 | A1 * | 5/2007 | Kimura .......................... 382/251 |
| 2010/0118921 | A1 * | 5/2010 | Abdelmonem et al. ....... 375/148 |

FOREIGN PATENT DOCUMENTS

WO 2007022627 3/2007

OTHER PUBLICATIONS

"DOCSIS™ Specifications—DOCSIS™ 3.0 Interface", 2013 CableLabs, <http://www.cablelabs.com/cablemodem/specifications/specifications30.html>, Nov. 17, 2011, 1 page, (Author unknown).
Frazier et al., "Introduction to IEEE 802.3 EPON Protocol over Coax (EPoC)", IEEE 802.3/ITU-T Joint Workshop, Geneva, Switzerland, Sep. 22, 2012, 11 pages.

(Continued)

*Primary Examiner* — Santiago Garcia
(74) *Attorney, Agent, or Firm* — Kacvinsky Daisak Bluni PLLC

(57) ABSTRACT

An apparatus may include a processor circuit, and a dynamic filter adjustment component for execution on the processor. The dynamic filter adjustment component may identify in a wideband communications signal a set of one or more interferer frequencies for one or more respective interferer channels of a set of communications channels to be filtered, select a kernel filter comprising a low pass filter having a channel width corresponding to a channel of the one or more interferer channels, and generate a co-channel interference (CCI) filter to stop the one or more interferer channels by inverting the kernel filter. Other embodiments are described and claimed.

28 Claims, 11 Drawing Sheets

(56) References Cited

OTHER PUBLICATIONS

"Data Over Cable Service Interface Specifications DOCSIS™ 3.0", Physical Layer Specification, CM-SP-PHYv3.0-I10-111117, Cable Television Laboratories, Inc, Nov. 17, 2011, 171 pages, (Author unknown).

"Data Over Cable Service Interface Specifications DOCSIS™ 3.0", Physical Layer Specification, CM-SP-PHYv3.0-I10-111117, Cable Television Laboratories, Inc, Nov. 17, 2011, 28 pages, (Author unknown).

International Search Report received for PCT Patent Application No. PCT/US2013/048382, mailed Sep. 4, 2013, 12 pages.

* cited by examiner

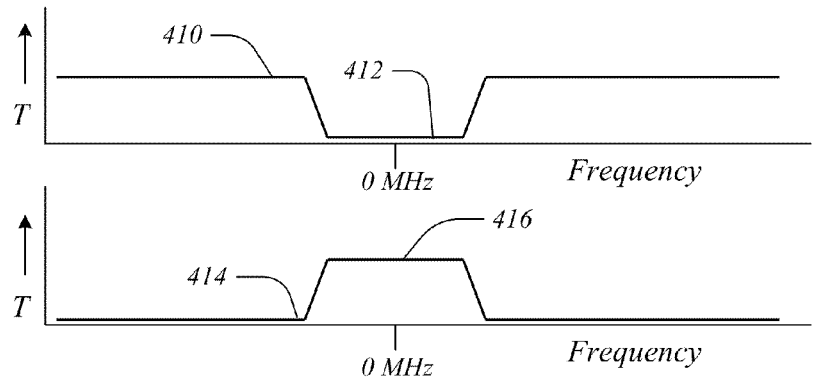
FIG. 4C
FIG. 4D
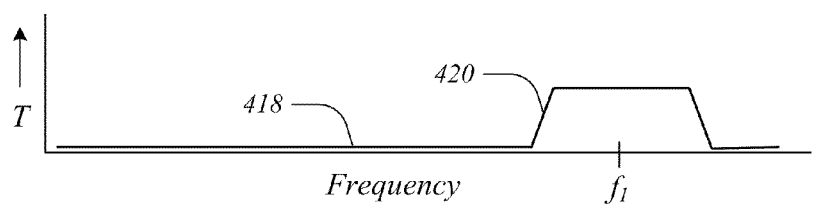
FIG. 4E
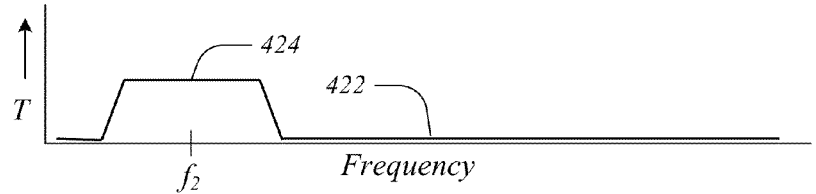
FIG. 4F
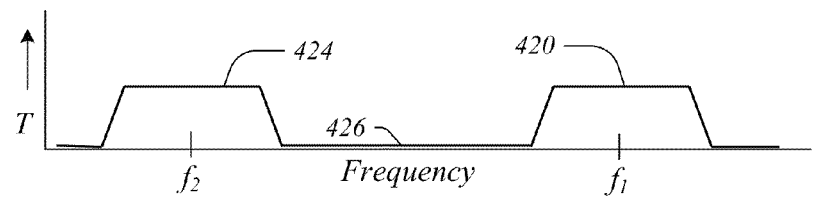
FIG. 4G
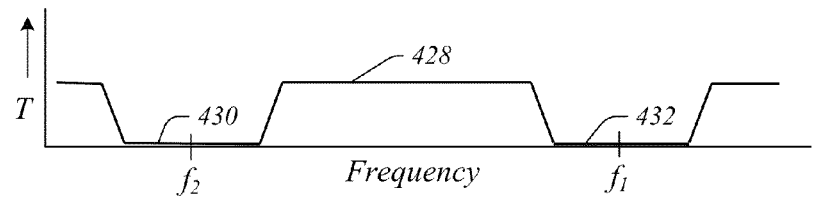
FIG. 4H

TECHNIQUES FOR MANAGING INTERFERENCE IN MULTIPLE CHANNEL COMMUNICATIONS SYSTEM

BACKGROUND

In present day broadband cable communications, Quadrature Amplitude Modulation (QAM) is typically employed to carry signals over multiple QAM channels that are distributed within a set frequency range. For example, multiple single carrier QAM channels approximately 6-8 MHz wide may be distributed over an allotted frequency range to carry different cable signals. To increase data capacity, future cable systems may employ orthogonal frequency division modulation (OFDM), which may entail channels having bandwidth in the neighborhood of 200 MHz. As OFDM technology is deployed in cable communications, it is envisioned that cable communications bands may need to support the ability to transmit both OFDM and QAM channels over a given physical cable. Thus, when wideband OFDM channels are deployed in an existing network that employs QAM, it is necessary to make allowance for existing single-carrier (6 or 8 MHz) QAM channels, e.g., legacy QAM channels, which may still be used to carry cable communications.

One approach that has been proposed to promote coexistence of QAM and OFDM channels is to employ wideband OFDM channels in which certain OFDM carriers are nulled in the spectral regions of legacy QAM channels. However, even if carrier nulling of the OFDM spectrum of the carriers on either side of a legacy QAM channel is implemented, significant interference to the legacy channel from OFDM signals may occur. It has been proposed to perform windowing of OFDM symbols to reduce this interference, which may be conducted at the transmitter end. A small amount (1%) of windowing may be effective in stopping the OFDM power from spreading into the legacy QAM channel region. This allows the OFDM carriers that are not nulled to be placed very close (within 1 MHz) to the edge of the legacy QAM channel without causing any interference to the legacy co-channel. In the above manner, QAM legacy channels may continue to carry cable signals without significant interference from new OFDM channels.

A converse of the problem of interference created in QAM channels by OFDM carriers is the potential interference created by legacy QAM channels on adjacent OFDM carriers. In particular, when the OFDM fast Fourier transform (FFT) is taken of a composite channel signal including OFDM and QAM channels, the co-channel interference (CCI) caused by legacy QAM channels exhibits a severe impact on many OFDM carriers that reside on either side of a QAM channel. This is because OFDM FFT entails applying a rectangular window function to the signal, which window function results in a significant spectral spread of legacy channel power in the frequency dimension. This interference may result in a loss of data carrying capacity that is undesirable or unacceptable, especially in cases in which more than one legacy QAM channel may be present among OFDM channels.

An additional source of interference for OFDM cable channels is that created by wireless devices, such as smartphones, cellular telephones and other devices that may be brought into proximity with a cable modem or other cable device receiving the OFDM signal. In some instances, a wireless device may be transmitting to a base station within a cable bandwidth (800-1000 MHz), and as a result may create severe interference to cable channels.

Accordingly, there may be a need for improved techniques and apparatus to solve these and other problems.

BRIEF DESCRIPTION OF THE DRAWINGS

FIG. 4C depicts details of one embodiment of a high pass filter.

FIG. 4D depicts details of one embodiment of a kernel filter constructed from the high pass filter of FIG. 4A.

FIG. 4E depicts shifting the kernel filter to a first frequency to form a first filter component.

FIG. 4F depicts shifting the kernel filter to a second frequency to form a second filter component.

FIG. 4G depicts a filter equaling a sum of the first and second filter components of FIGS. 4E and 4F.

FIG. 4H depicts an embodiment of a co-channel interference filter constructed from the filter of FIG. 4G.

DETAILED DESCRIPTION

Various embodiments may comprise one or more elements. An element may comprise any structure arranged to perform certain operations. Some elements may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

The present embodiments are related to communications procedures to reduce interference among different communications channels within a frequency range. Various embodiments facilitate coexistence of multiple channels of one carrier type that may be dispersed in a frequency range occupied by carriers of a second carrier type. In particular, the present embodiments are related to filter design and operation that entails use of a single filter to reduce co-channel interference caused by any number of channels of a first type of carrier that are embedded in a frequency range occupied by carriers of a second type. In some embodiments, a single filter may be used to eliminate the co-channel interference effect of any number of embedded legacy QAM channels (co-channel interference sources) on OFDM sub-carriers present within an OFDM bandwidth.

In some embodiments a single filter may be used to prevent interference by QAM channels on OFDM sub-carriers, while pulse-shaping of OFDM symbols is used to prevent OFDM sub-carriers from interfering with QAM channels. In this manner communications such as cable communications may arrange useful OFDM sub-carriers at frequencies very close to the edge of holes in the wideband OFDM signal that are created to accommodate the legacy channels. This facilitates maximizing of OFDM signal without interfering with embedded QAM legacy channels.

In other embodiments, the single filter design detailed herein may be deployed for interference cancellation in which any combination of wired or wireless interferers may interfere with a wideband signal.

Figure 1:
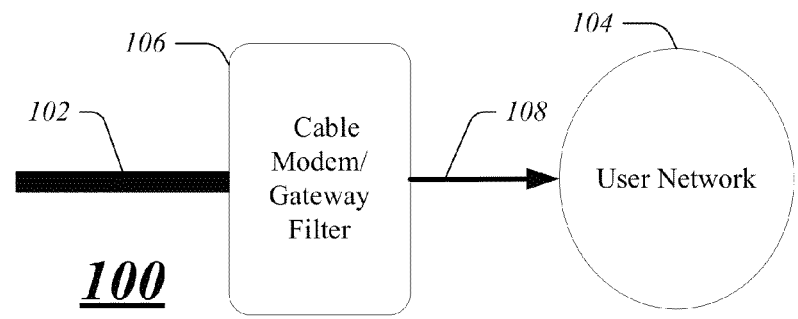
FIG. 1 depicts an embodiment of a system.

FIG. 1 depicts one system 100 for cable communications that is consistent with the present embodiments. The system 100 includes cable 102, which may include a hybrid fiber and coaxial connection to transmit a signal from a provider (not shown). The cable 102 may provide signals in some cases that include multiple carrier types that are capable of transmitting content to a user network 104. In various embodiments, the user network 104 may include any combination of wired and wireless networks.

In some embodiments, the cable may transmit communications according to the Data Over Cable Interface Specification (DOCSIS) standard. DOCSIS® is an international telecommunications standard that is established and updated by Cable Television Laboratories, Inc. (CableLabs®), which is a non-profit research and development consortium. DOCSIS standard facilitates the addition of high-speed data transfer to systems that can carry other cable signals, including TV signals. It is employed by many cable television operators to provide internet access over existing hybrid fiber-coaxial (HFC) infrastructure. In a forthcoming release, the DOCSIS 3.1 standard also incorporates orthogonal frequency division multiplexing (OFDM) for both upstream and downstream communications. The use of wideband OFDM channels having, for example, 200 MHz width, affords the ability to increase data rate significantly as compared to conventional DOCSIS 3.0 QAM channel technology. However, when OFDM channels are deployed in an existing network environment, it is necessary to make allowance for QAM channels to preserve communications integrity.

Figure 2:
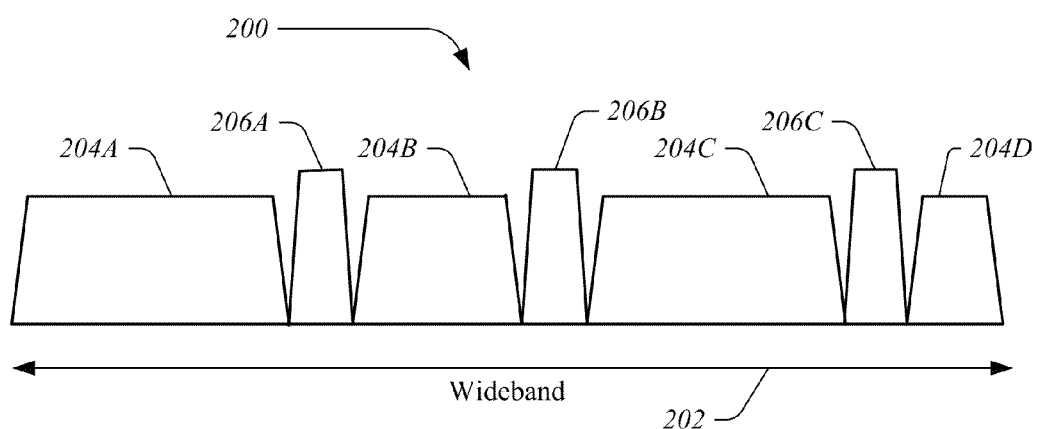
FIG. 2 depicts one exemplary wideband signal.

FIG. 2 depicts one exemplary wideband signal 200 that includes communications channels in a wideband 202. The wideband 202 may span a frequency range of 200 MHz in one example. In one instance, the wideband 202 may include multiple OFDM wideband channels 204A, 204B, 204C, and 204D, which are interspersed with QAM channels 206A, 206B, and 206C. In some examples, the QAM channels 206A, 206B, 206C may represent single carrier channels having a width of 6 MHz or 8 MHz. In the example illustrated, the signal power in the QAM channels is illustrated as being higher than that of adjacent OFDM wideband channels 204A. 204B, 206C, and 204D. However, in other examples, the QAM signal power may be lower. In order to reduce interference from the OFDM carriers, windowing may be performed on OFDM symbols at the transmitter, as noted above.

However, QAM channels may nevertheless leak power into spectral ranges that overlap the OFDM wideband channels 204A-204D. In particular, in the scenario of FIG. 2, if the OFDM fast Fourier transform (FFT) is performed on the composite signal shown, the co-channel interference caused by QAM channels 206A-206C may have a severe impact on many OFDM carriers on either side of the QAM channel. This is because OFDM FFT implies applying a rectangular window function to the signal that results in a significant spectral spread of QAM channel power in the frequency dimension. Simulations have shown that a spectral region of about 10-40 MHz on each side of a QAM channel thereby becomes unusable by OFDM carriers, with the exact amount of unusable spectrum being dependent on sub-carrier modulation and the relative power of the QAM channels as compared to the OFDM channels. In any case, if the wideband 202 spans a range of 200 MHz, it can be seen that a large fraction of the entire frequency range may be rendered unusable by the presence of only a few QAM channels, such as channels 206A-206C depending upon the distribution of such QAM channels.

Figure 3A:
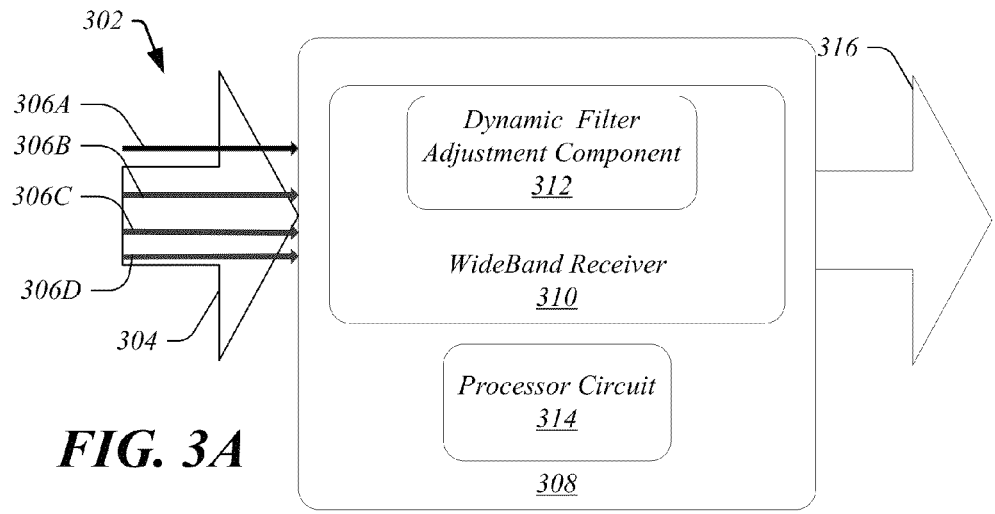
FIG. 3A provides an embodiment of a modem to filter a wideband signal.

In order to address this problem, and consistent with the present embodiments, a filter may be applied to a composite wideband signal, as shown in FIGS. 1 and 3. In FIG. 1, the cable 102 is coupled to a component to filter an incoming wideband signal, such as the wideband signal 200. As shown, a cable modem/gateway filter 106 is provided to filter an incoming cable signal and output a filtered wideband signal 108 to a user network 104. FIG. 3A provides an embodiment of a modem 308 to filter a wideband signal 302. The wideband signal 302 may include wideband OFDM signal 304 and QAM single carrier channels 306A-306D that are received as a common signal over a cable in one example.

When the wideband signal 302 is received by the wideband receiver 310, the wideband OFDM signal 304 and the signal of the QAM single carrier channels 306A-306D may interfere with one another. The dynamic filter adjustment component 312 may filter the QAM single carrier channels 306A-306D so that carriers within the OFDM signal 304 can be more completely used to maximize the data capacity of the OFDM signal 304. As illustrated, the dynamic filter adjustment component 312 may output the filtered signal 316.

In particular, the dynamic filter adjustment component 312 may execute procedures on the processor circuit 314 to adjust filtering to account for any QAM channels that may be present in the wideband signal 302. In various embodiments, the dynamic filter adjustment component 312 may generally operate to construct a filter to filter interferers such as QAM signals within a received wideband composite signal whether or not the position of the interferer channels is known a priori.

In additional embodiments, the dynamic filter adjustment component 312 may dynamically construct a filter to filter out other types of interferers such as wireless interferer channels that may overlap in frequency with a frequency range such as that of the OFDM signal 304.

Figure 3B:
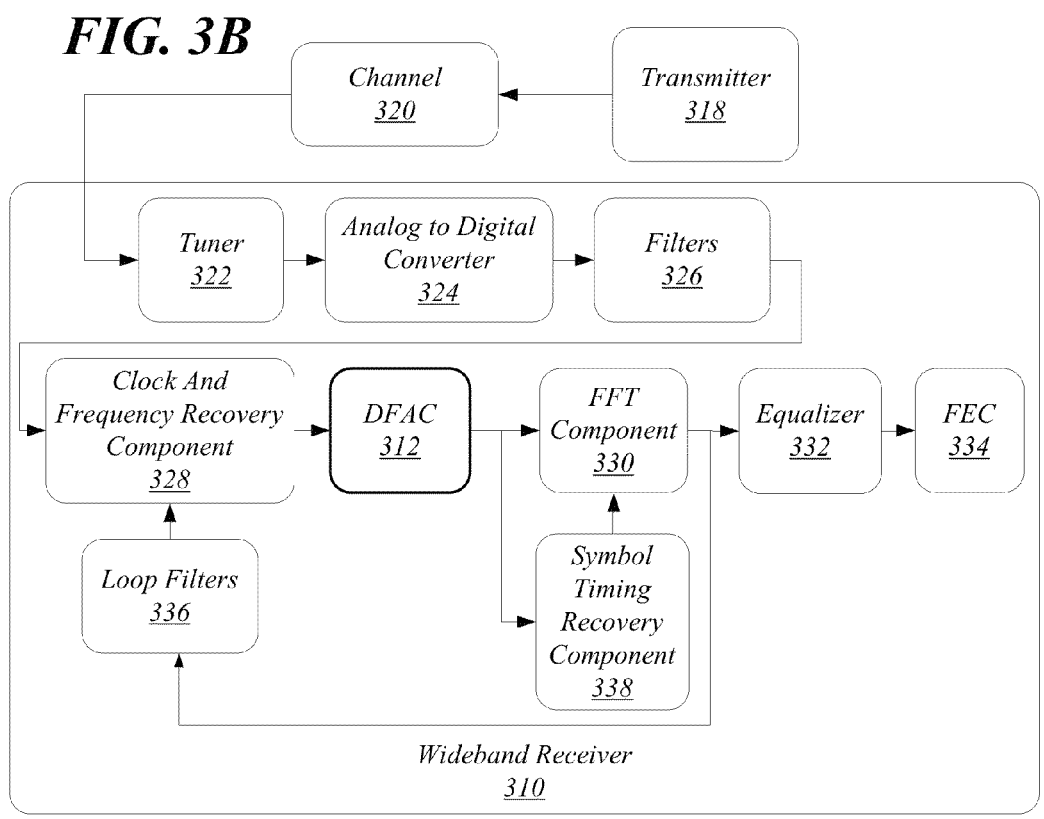
FIG. 3B depicts an embodiment of a wideband receiver.

FIG. 3B depicts a block diagram showing details of one embodiment of the wideband receiver 310. The wideband receiver 310 may receive a wideband signal from a transmitter 318 over the channel 320, which may be processed as illustrated. The tuner 322, analog-to-digital converter 324, filters 326, clock and frequency recovery component 328, FFT component 330, equalizer 332, forward error correction component 334, loop filters 336, and symbol timing recovery component 338 may be conventional components that function generally according to known operation principles. As further illustrated in FIG. 3B, the dynamic filter adjustment component (DFAC) 312, whose operation is detailed below, may perform filtering operations before FFT is performed on a received signal.

Figure 4A:
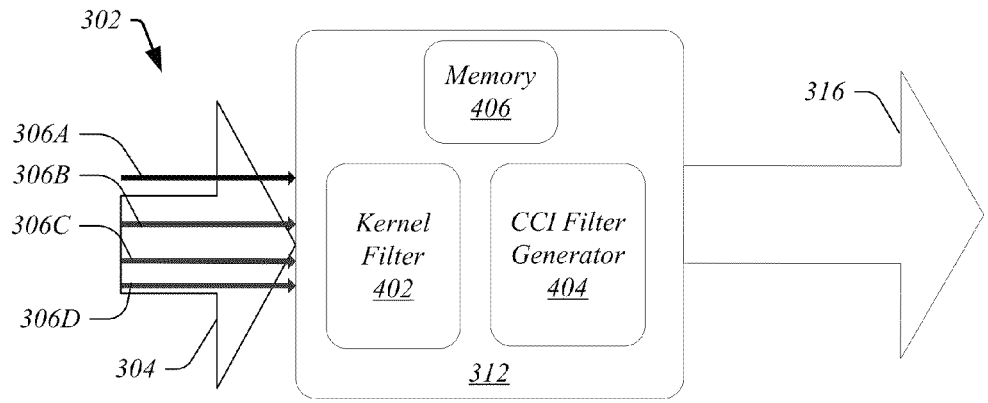
FIG. 4A depicts details of one embodiment of a dynamic filter adjustment component.

FIG. 4A depicts details of one embodiment of a dynamic filter adjustment component 312. Notably, in various embodiments the dynamic filter adjustment component 312 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

As shown in FIG. 4A, the dynamic filter adjustment component 312 includes a kernel filter 402, co-channel interference (CCI) filter generator 404, and memory 406. Consistent with various embodiments, the kernel filter 402 may entail one or more filters that are predesigned according to the type of interferer to be filtered and may be prestored in memory 406. Following the example shown in FIGS. 2-4 of single carrier QAM channels that may be embedded in a wideband signal including OFDM carriers, the dynamic filter adjustment component 312 may operate generally in the following manner. A kernel filter 402 may be designed according to the channel characteristics of a 6 MHz or 8 MHz wide single carrier QAM channel. For example, a 6 MHz kernel filter may be designed to filter 6 MHz single carrier QAM channels. The kernel filter 402 may be stored in firmware or other memory of a device such as modem 308. When a composite wideband signal, such as wideband signal 302, is received at the modem 308, the co-channel interference (CCI) filter generator 404 may load the appropriate kernel filter 402 to create a stop filter to filter the desired signal components, as detailed below.

As discussed below, among the advantages afforded by the dynamic filter adjustment component 312 is the reduced complexity and reduced hardware required to perform filtering of an interferer from a composite signal. A conventional manner to "filter-out" an interfering (e.g., legacy QAM) channel embedded in a frequency range carrying desired signal is to employ a band-stop filter. If this approach is adopted in the scenario illustrated in FIG. 2 in which multiple interfering QAM channels 206A-206C are present, a band-stop filter must be constructed for every interfering co-channel. In general, there may be a large and (a priori) unknown number of such interfering co-channels embedded with a wideband signal, such as an OFDM signal, requiring a band stop filter for each channel. Even if the number of channels to be filtered were known, such a task adds significant complexity and hardware requirements.

In the present embodiments, the dynamic filter adjustment component 312 employs a different approach to address this problem. In particular, instead of filtering out an interfering channel, the kernel filter 402 is designed to "filter in" a channel of an interferer. The term "filter in" as used herein refers to the process of creating a passband in a filter to match the position of an interferer. For a given frequency $f_1$ of a first interferer channel, such as a QAM channel, an N-tap band pass filter $h_1(i)$, (i=0, 1, ... N−1) may be designed to "filter in" the identified channel, where N represents any positive integer. In the case of a second interferer channel, the filter to "filter in" the second channel at a frequency $f_2$ may be expressed as $h_2(i)$, (i=0, 1, ... N−2). Using the known Frequency Shift theorem, the second filter $h_2(i)$ may be derived from the first filter according to $h_2(i){,}=h_1(i)\exp(j2\pi(f_2-f_1)T)$, where T is the sampling interval and D is the delay in samples.

In accordance with the above procedure, a filter to filter in both first and second channels at the same time may be expressed as $(h_1(i)+h_2(i))=h_1(i)(1+\exp(j2\pi(i-D)(f_2-f_1)T))$. In this manner, a single N-tap filter may be constructed that filters in both potential interfering channels at the same time. Consistent with the present embodiments, to construct a filter to filter in M interferer channels according to the above approach, a unity DC gain low-pass filter may be designed in the baseband, which filter is termed herein a "kernel filter." As noted above, in various embodiments, this kernel filter may be prestored as the kernel filter 402 in the dynamic filter adjustment component 312.

A combined filter to filter in the M interferer channels, where M represents any integer greater than zero, may be constructed by the CCI filter generator 404 by shifting this kernel filter 402 to each channel frequency $f_k$. The combined filter may be expressed as:

$$h(i) = \sum_{k=1}^{M} h_0(i)\exp(j2\pi(i-D)f_k T) \text{ for } i = 0, 1, 2, \ldots, N-1 \quad (1)$$

Once a combined N-tap pass filter h(i) is constructed to "filter in" the M interferer channels, such as QAM channels, a filter to filter out the M interferer channels from a composite signal may be designed as follows. The following filter is defined:

$$g(i)=\delta(i-D)-h(i) \text{ for } i=0,1,2,\ldots,N-1 \quad (2)$$

where D represents group delay of a finite impulse filter and $\delta(\cdot)$ represents the standard impulse function.

In a further operation, an interferer stop filter, also referred to herein as a co-channel interference (CCI) cancellation filter, may be constructed by inverting the combined N-tap pass filter, that is by subtracting the combined N-tap pass filter h(i) from a unity filter I. Thus, the CCI filter is represented by I−h(i). When the combined N-tap pass filter is subtracted from the unity filter each pass band which formerly passed an interferer channel is transformed into a stop band that blocks the given interferer channel.

In some embodiments, the kernel filter is designed according the stop band characteristics of the kernel filter. This is because the stop band portion of the kernel filter is transformed into a pass band of the eventual CCI filter to be to be constructed, which is used to pass only the desired carriers, such as OFDM carriers. Accordingly, in order to construct the kernel filter, a high pass filter HPF is constructed with the appropriate characteristics and is subtracted from the unitary filter I to form the kernel filter, which equals I-HPF. In particular, the high pass filter HPF may be designed with a very flat pass-band, which is then used to derive the kernel filter. This results in a low-pass filter having a very flat stop band. In this manner, the interferer stop filter (CCI filter) that is finally constructed may be determined by subtracting the kernel filter (I-HPF) from a unity filter for each frequency of the interferer channels to be filtered.

In particular, the output of the CCI filter may be defined as a function of the input of a composite wideband signal:

$$[\text{Output}] = \left[ I - \sum_{k=1}^{M} (I - HPF)_{frequency\_shift(k)} \right] [\text{Input}] \quad (3)$$

The advantages of providing filtering of a composite signal according to the present embodiments are several. In the first place, in various embodiments, only a single (kernel) filter is predesigned to support filtering for various different composite signals where multiple different channels may be filtered. Also, a CCI filter to stop any number of interferer channels in a composite signal may be constructed (generated) dynamically when the number of interferer channels and locations are empirically determined by a receiver to receive the composite signal. Thus, any number of interference scenarios may be potentially accounted for by the single dynamic filter adjustment component 312. This avoids the necessity of having to determine in advance the number of legacy interferer channels and their position within a composite signal that may be sent by a cable provider, which in general may vary among cable providers and may additionally change over time.

Figure 4B:
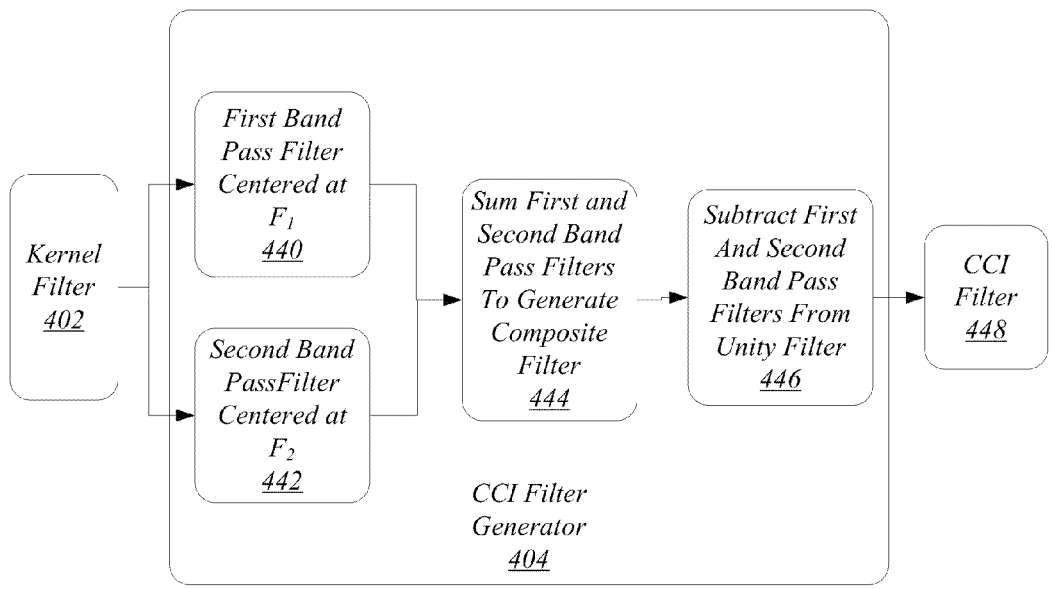
FIG. 4B depicts one example of architecture of a dynamic filter adjustment component.

FIG. 4B depicts one example of architecture of the dynamic filter adjustment component 312 to implement dynamic generation of a CCI filter. In this example, a co-channel interference filter 448 is constructed with two different stop bands to filter out two respective interferer channels. In this example, the CCI filter generator 404 may identify two different interferers located at two different frequencies $f_1$ and $f_2$. The frequencies $f_1$ and $f_2$ may represent the center of frequency bands of the interferers, which each may span 6 MHz in the case of a QAM channel. The CCI filter generator 404 may therefore load the appropriate kernel filter 402, which may be designed to filter out a 6 MHz QAM channel interferer. The kernel filter 402 is used by the CCI filter generator 404 to generate two pass band filters: a first pass band filter 440 centered at frequency $f_1$ and a second pass band filter centered at frequency $f_2$. The CCI filter generator 404 then sums the first and second pass band filters 440, 442 to create a composite filter 444. The composite filter is then subtracted from a unity filter 446, the output of which is a CCI filter which contains stop bands at the frequencies $f_1$ and $f_2$.

To further illustrate operation of the dynamic filter adjustment component 312, FIGS. 4C to 4H depict an exemplary implementation of a co-channel interference filter in which two different interferer channels are blocked. FIG. 4C depicts details of one embodiment of a high pass filter 410 used to construct a kernel filter as discussed above. The signal transmission T is shown as a function of frequency. As illustrated, the high pass filter 410 includes a stop band 412 centered around 0 MHz in the baseband. The stop band 412 may be created to filter potential interfering channels of an interferer such as a QAM channel having a channel width of 6 MHz in one example. In another example, the stop band 412 may be designed to filter a QAM interferer having a channel width of 8 MHz.

In FIG. 4D, a kernel filter 414 is created by subtracting the high pass filter 410 from a unity filter. In this case, a pass band 416 is created in the baseband. In FIG. 4E, a first filter component 418 is created by shifting the pass band 416 of the kernel filter 414 to a frequency $f_1$ of a detected interferer, thereby forming a shifted pass band 420. In FIG. 4F, a second filter component 422 is created by shifting the pass band 416 of the kernel filter 414 to a frequency $f_2$ of a second detected interferer, thereby forming a second shifted pass band 424. In FIG. 4G the two filter components 418 and 422 are summed to form a composite passband filter 426 having two pass bands 424 and 420. At FIG. 4H, a co-channel interference filter 428 is formed by subtracting the composite passband filter 426 from a unity filter, thereby forming the two stop bands 430 and 432 that are effective is attenuating interferers centered at the frequency $f_1$ and frequency $f_2$. It can be seen that the CCI filter 428 is constructed by shifting the kernel filter 414 to the appropriate frequencies of detected interferers and inverting the kernel filter 414.

Consistent with some embodiments, the kernel filter may be designed in a semiconductor chip at the chip design stage. The coefficients of this filter may be input, for example, via registers into the semiconductor chip, which is installed in a device such as the cable modem 308. When the cable modem 308 subsequently receives a wideband composite signal, the appropriate interferer stop filter may be constructed to match the cable signal generating conditions of the cable provider that transmits the wideband composite signal. Thus, in various embodiments only the kernel filter need be prestored in hardware, which may be designed according to the characteristics of the interferer to be filtered. When the interferer channels are subsequently detected in the cable signal, the kernel filter may be reproduced as a bandpass filter at each of the one or more appropriate frequencies corresponding to the interferer channels (forming the combined filter), and then inverted at each interferer channel to form the final CCI filter, which constitutes a band top filter for each interferer frequency.

To dynamically construct the CCI filter, in order to implement the Eqs. (1) and (2) above, the dynamic filter adjustment component 312 may interrogate a trigonometric table and multiplier (not shown). However, in accordance with the present embodiments, a CCI filter may be constructed to block any number of interferer channels without changing the number of taps as the kernel filter from which each interference stop filter is created.

A further advantage afforded by present embodiments is that the kernel low pass filter to be used to construct the CCI filter need not in many cases exhibit good out-of-band rejection capability. This is because, in the case of QAM channels embedded in a wideband OFDM signal, the power of interfering QAM channels may be reduced sufficiently to limit spread to adjacent OFDM carriers without entirely limiting the signal in the QAM channel region.

Figure 5:
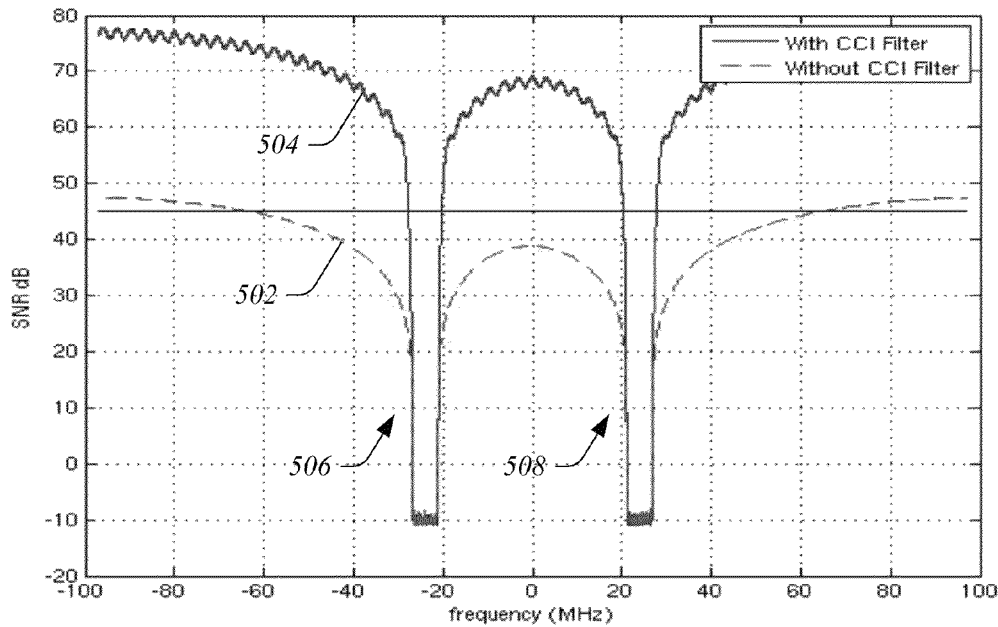
FIG. 5 presents the results of simulation of exemplary filter operation.
Figure 6:
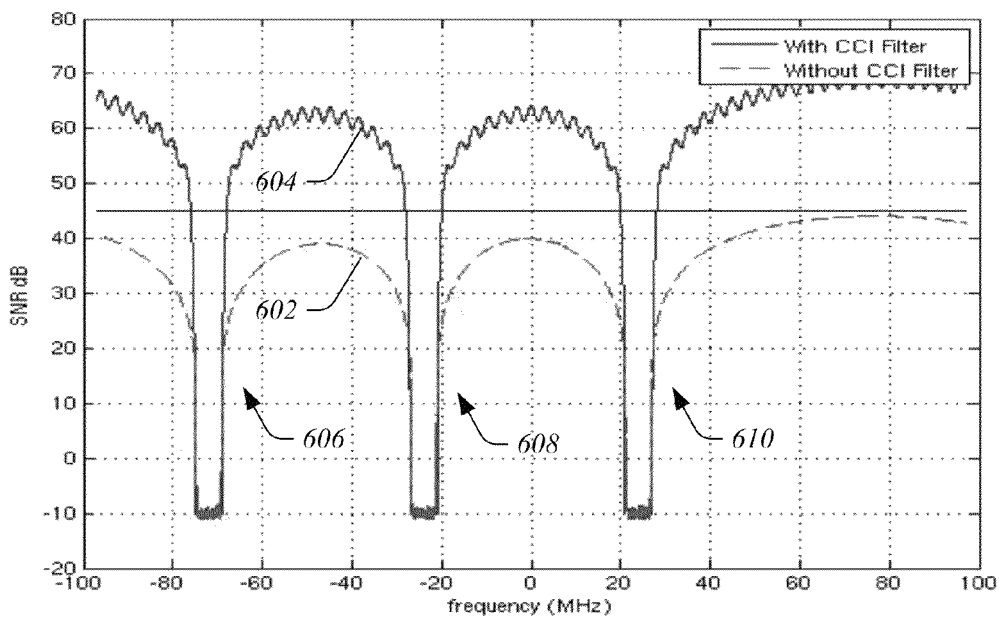
FIG. 6 present further results of simulation of exemplary filter operation.
Figure 7:
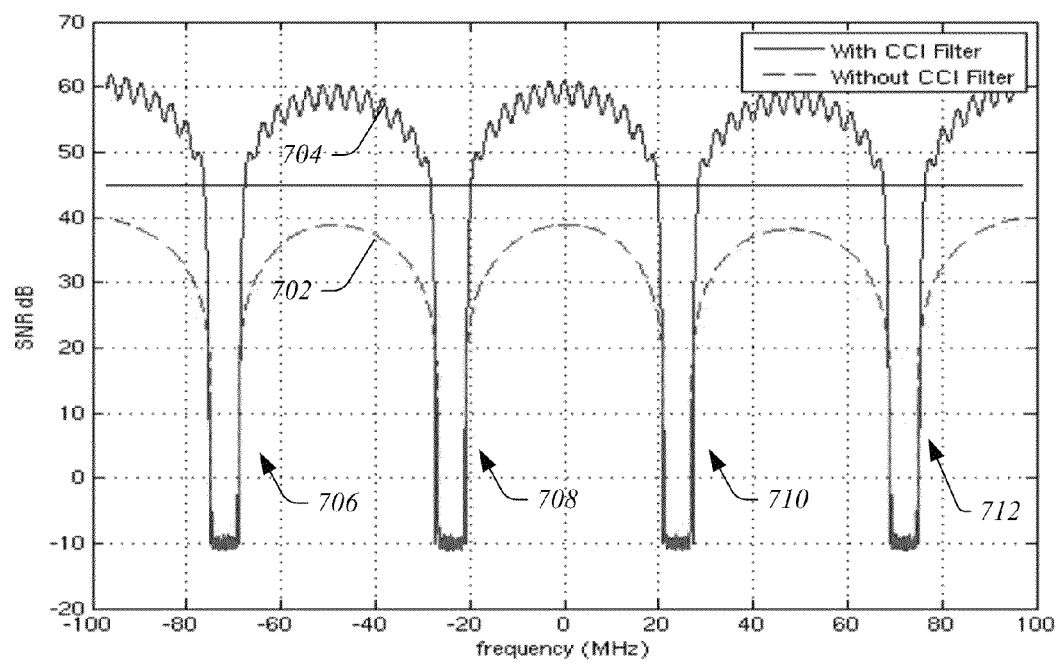
FIG. 7 present additional results of simulation of exemplary filter operation.

Although the above description has focused on scenarios in which QAM carriers are embedded in an OFDM signal, the interference filters of the present embodiments cover other communications technologies in which co-channel interference is to be managed. As noted, one aspect of the present embodiments is the ability to generate different interference filters to filter varying numbers of interference channels using a common kernel filter. In embodiments that employ a filter to filter a received composite signal that contains an OFDM signal, modulator and demodulator implementation takes place using the FFT algorithm at the receiver filter. FIGS. 5-7 present the results of simulation of exemplary filter operation (labeled as a co-channel interference filter, or CCI in the FIGS. 5-7) for an OFDM signal in which 6 MHz wide single carrier QAM channels are embedded. In all three figures, the CCI represents a 129-tap finite impulse response (FIR) filter whose coefficients are adjusted to according to the number of interfering channels. In the simulations presented the FFT size is 16 K (K=1,024) with a sample rate of 204.8 M samples/s (80 μs symbol length). The power spectral density of an in-band 6 MHz single carrier QAM channel is assumed to be +10 dB with respect to the power spectral density of the OFDM signal, which is a common assumption regarding adjacent channel interference (ACI) in typical cable communications systems.

In the simulations shown in FIGS. 5-7 after computing the OFDM FFT, the signal-to-noise ratio (SNR) of individual sub-carriers is measured by comparing the known transmitted sub-carriers. This sub-carrier SNR is then plotted as a function of sub-carrier frequency in the baseband region, covering a spectral region of −100 to 100 MHz In FIG. 5 there is shown the results of simulation in which two 6 MHz QAM channels are embedded within the spectral range with a mutual separation of about 40 MHz. The curve 502 represents the SNR as a function of frequency that results when no CCI filter is used. For reference a horizontal line is drawn at the level of 45 dB.

Notably, in next generation cable, the standards are designed to achieve very high levels of spectral efficiency that requires a very dense QAM constellation. For example, one goal of future cable standards is to achieve 4096QAM (OFDM) with a low-density parity-check (LDPC) code rate of about 0.9. In such a system, the ideal additive white Gaussian noise (AWGN) SNR to achieve quasi-error-free (bit error rate of 1E-8) performance is about 35 dB. Any additional interference may degrade the performance of such a system. Accordingly, to minimize performance degradation, it may be desirable to limit to interference to a level at least 10 dB below such a noise floor, which suggests an ideal threshold of about 45 dB.

As illustrated in FIG. 5, the SNR value of curve 502 crosses below 45 dB at about −60 MHz (and +60 MHz) in the symmetrical arrangement of two QAM channels 506, 508 about 0 Hz. Notably, in FIGS. 5-7, the actual QAM channels are not shown, but rather the SNR signature of such channels, and in particular the abrupt change in SNR on either side of a channel. The position at which the SNR curve 502 drops below 45 dB represents a displacement of greater than 30 MHz from the edge of the respective QAM channels 506, 508. Moreover, the SNR crosses the level of 35 dB at about +/−35 MHz, well away from the respective QAM channels 506, 508. In addition, the SNR remains noisy below 45 dB at all regions of the spectrum between the QAM channels 506 and 508.

In contrast, the SNR value of the curve 504 representing a signal after CCI filtering, remains well above 45 dB in regions significantly outside of the QAM channels 506, 508. For example, the width of the downward peak in the curve 504 in the QAM channels 506 and 508 is only about 7.5 MHz at 45 dB level. This indicates that an "ideal" SNR level at or above 45 dB is achieved within 1 MHz distance from an edge of the 6 MHz channels ((7.5 MHz SNR peak width−6 MHz channel width)/2)=0.75 MHz).

Turning now to FIG. 6 there is shown results of simulation of exemplary filter operation in the presence of three 6 MHz wide QAM channels. In this example, the channels 608, 610 are arranged at the positions of respective QAM channels 506, 508 of FIG. 5. In addition, a third channel 606 is arranged at about −72 MHz. The curve 602 represents SNR without the use of a CCI filter. In this example, the SNR of the curve 602 never reaches the ideal level of 45 dB within the spectral range from −100 MHz to +100 MHz. Moreover, the SNR level is below 35 dB for spectral regions within about 10 MHz of the edge of a QAM channel 606, 608, 610, indicating significant noise spread within adjacent regions that may be occupied by OFDM carriers. In contrast the SNR value of the curve 604 representing signal after CCI filtering, remains well above 45 dB in regions >~1 MHz outside of the QAM channels 606, 608, 610.

Turning now to FIG. 7 there is shown results of simulation of exemplary filter operation in the presence of 4 6 MHz wide QAM channels. In this example, the QAM channels 708, 710 are arranged at the positions of respective QAM channels 506, 508 of FIG. 5. In addition, a third channel 706 is arranged at about −72 MHz and fourth channel 712 at about +72 MHz. The curve 702 represents SNR without the use of a CCI filter. In this example, the SNR of the curve 702 remains below a level of about 40 dB within nearly the entire spectral range from −100 MHz to +100 MHz. Moreover, the SNR level is below 35 dB for spectral regions within about 10 MHz of the edge of a QAM channel, 706, 708, 710, and 712, indicating significant noise spread within adjacent regions that may be occupied by OFDM carriers. If an SNR level of 35 dB is deemed minimally acceptable for use by OFDM carriers, it can be immediately ascertained that about 40% or so of the spectral range outside of the QAM channels 706-712 is unusable. In contrast, when a CCI filter is employed the resulting curve 704 indicates that the SNR remains above 45 dB for nearly the entire portion of the spectrum outside of the 6 MHz wide QAM channels 706-712.

In accordance with various embodiments, SNR measurements of a composite signal may be performed when the cable signal is delivered to a user at a modem, cable gateway, or other point to be used to filter the incoming signal. The frequency and number of interferer channels may thereby be determined and filter coefficients to be applied to the CCI filter may be derived from the channel frequency information. In alternative embodiments, an adaptive algorithm to run on the dynamic filter adjustment component 312 to self-adapt the filter coefficients according to a present interference scenario.

As evidenced from the results presented in FIGS. 5-7, co-channel interference from single carrier QAM channels can be suppressed using a single 129-tap FIR filter for different QAM channel scenarios. Because varying the number of interferer channels does not require the number of taps in the CCI filter to change, based upon a single kernel filter, a variable CCI filter may be dynamically generated to address different wideband interference scenarios where the position, frequency, and/or width of interfering channels varies.

Figure 8:
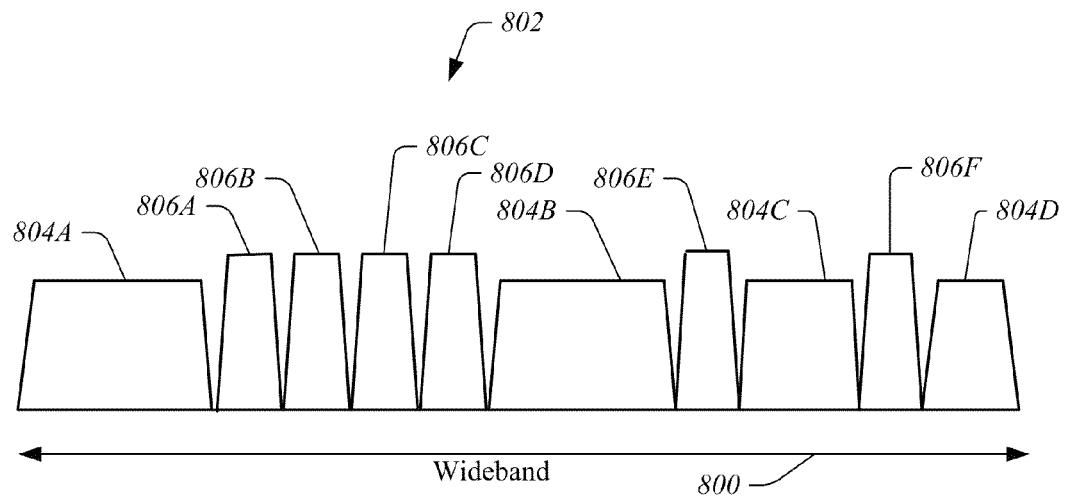
FIG. 8 depicts one exemplary wideband signal that includes communications channels in a wideband.

Notably, a CCI filter may be designed to filter out any configuration of interfering channels including configurations in which multiple channels are grouped together. FIG. 8 depicts one exemplary wideband signal 802 that includes communications channels in a wideband 800. The wideband 800 may span a frequency range of 200 MHz as in the example of FIG. 2. In one instance, the wideband 800 may include multiple OFDM wideband channels 804A, 804B, 804C, and 804D, which are interspersed with QAM channels 806A-806F. In this example, the QAM channels 806A-806D are grouped together. In accordance with the present embodiments, a kernel filter as discussed hereinabove may be employed to construct a CCI filter that filters out the QAM channels 806A-806F including the channels 806A-806D, which are grouped together. In the example illustrated, the signal power in the QAM channels is illustrated as being higher than that of adjacent OFDM wideband channels 204A, 204B, 206C, and 204D. However, in other examples, the QAM signal power may be lower. In order to reduce interference from the OFDM carriers, windowing may be performed on OFDM symbols, as noted above, at the transmitter.

As noted previously, in addition to addressing co-channel interference due to cable signals such as QAM signals that are embedded within a wideband OFDM signal, the present embodiments cover interference filtering to mitigate interference from other sources such as wireless carriers. In some cellular communications, a carrier may occupy a 10 MHz bandwidth, while in other scenarios, a carrier may still occupy another bandwidth. It may thus be inconvenient to design a kernel filter for every possible bandwidth that an interferer may occupy.

To address this issue, in some embodiments, a set of multiple kernel filters may be prestored, where each kernel filter has a different bandwidth. In accordance with various embodiments, one or more kernel filters may be dynamically selected at the time of receipt of a composite wideband signal that includes interferer channels. In some cases, if the interferer channel width matches that of a given prestored kernel filter, that prestored kernel filter may be selected to generate a CCI filter to filter out the offending interferer channel(s). However, if none of the single prestored kernel filters matches the interferer channel width, two or more kernel filters may be combined to generate the appropriate CCI filter that matches the bandwidth of the interferer channels.

In one example, a set of four kernel filters may be prestored in the memory 406. The kernel filters may comprise a 1 MHz low pass filter, 2 MHz low pass filter, 4 MHz low pass filter, and 8 MHz low pass filter all centered at zero frequency, where each kernel filter is constructed by subtracting a respective high pass filter from unity filter as described above. It will be readily appreciated by those of ordinary skill in the art that these kernel filters may be combined to form a product kernel filter having any bandwidth between 1 and 15 MHz in integrals of 1 MHz. In this manner, by storing a finite number of kernel filters, the present embodiments facilitate generating additional kernel filters by adding two or more prestored kernel filters together.

Figure 9A:
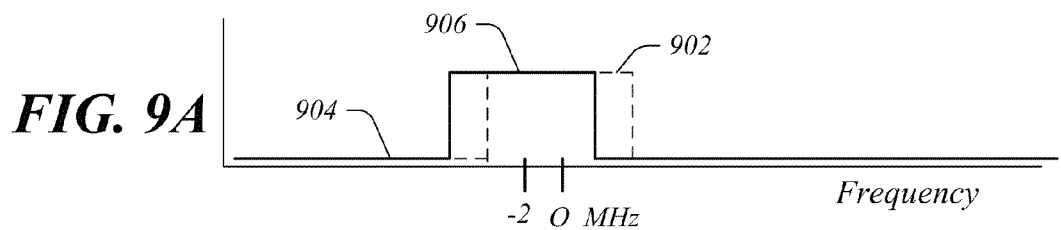
FIG. 9A depicts details of one embodiment of generating a kernel filter.
Figure 9B:
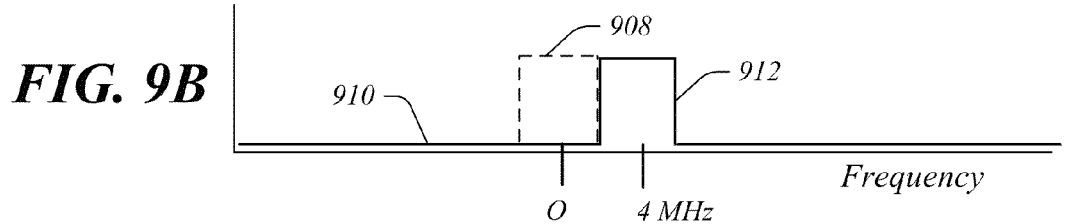
FIG. 9B depicts details of an embodiment of generating a second kernel filter.
Figure 9C:
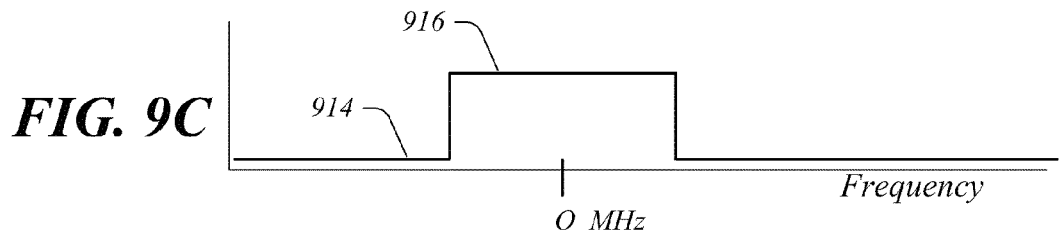
FIG. 9C depicts details of one embodiment of generating a third kernel filter from the kernel filters of FIGS. 9A and 9B.

In one scenario, a 12 wide MHz interferer may be discovered during reception of a cable signal. Assuming the above set of four prestored kernel filters are available in the memory 406, the CCI filter generator 404 may determine that no single prestored kernel filter matches the width of the interferer channel(s), and may therefore determine the appropriate kernel filters to select to build a product kernel filter that combines two or more prestored kernel filters. FIGS. 9A to 9C illustrate an embodiment of constructing a product kernel filter to filter a 12 MHz interferer.

As an initial operation, the CCI filter generator 404 may determine that a 12 MHz CCI filter can be constructed by adding together an 8 MHz prestored kernel filter together with a 4 MHz prestored kernel filter. In FIG. 9A there is shown an 8 MHz kernel filter 902, which is centered at 0 MHz. In order to generate a final product kernel filter having 12 MHz bandwidth, the CCI filter generator 404 may first shift the 8 MHz kernel filter 902 in frequency. FIG. 9A depicts a shifted 8 MHz filter 904 having a passband 906 centered at −2 MHz.

In FIG. 9B there is shown an 4 MHz kernel filter 908, which is centered at 0 MHz. In order to generate a final product kernel filter having 12 MHz bandwidth, the CCI filter generator 404 may also shift the 4 MHz kernel filter 908 in frequency. FIG. 9B depicts a shifted 4 MHz filter 910 having a passband 912 centered at +4 MHz.

Turning now to FIG. 9C, there is shown a product kernel filter 914 that is formed by adding the shifted 4 MHz filter 910 to the shifted 8 MHz filter 904. As illustrated the product kernel filter 914 has a passband 916 centered at 0 MHz. This product kernel filter may be employed by the CCI filter generator 404 to generate the appropriate CCI filter to filter out the detected 12 MHz interferers, as generally described above with respect to FIGS. 3-4H.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
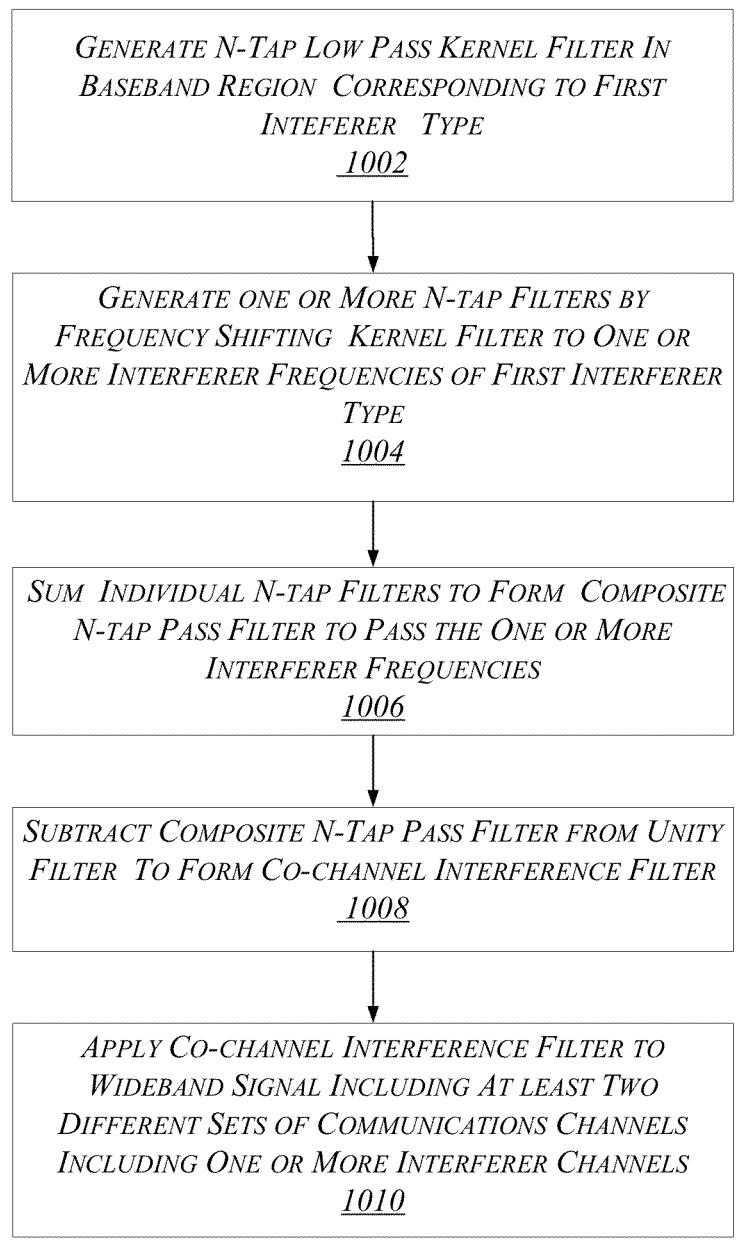
FIG. 10 depicts an exemplary first logic flow.

FIG. 10 depicts an exemplary first logic flow 1000. The logic flow 1000 may be implemented, for example, in an adjustable filter component of a cable modem or cable gateway. At block 1002 an N-tap low pass kernel filter is generated in a based spectral region. The low pass kernel filter is constructed according to an interferer type such as a single carrier interferer or any other interferer to be filtered from a signal.

At block 1004, one or more N-tap filters are generated by frequency shifting the kernnel filter to one or more interferer frequencies of a first interferer type. The interferer frequencies may be determined by measuring a received cable wideband signal in one instance. The kernel filter may be applied over one or more channels corresponding to the determined frequencies of the interferers by applying the frequency shift theorem to shift the frequency of the low pass filter in the baseband to the appropriate frequency or frequency of the actual interferer in a wideband signal. The flow then proceeds to block 1006.

At block 1006 the individual one or more N-tap filters are summed to form a composite N-tap pass filter that acts as an interferer pass filter to pass the one or more interferer frequencies.

At block 1008, the composite N-tap pass filter is subtracted from a unity filter to form a co-channel interference filter. At block 1010, the co-channel interference filter is applied to a received wideband signal that includes at least two different set of communications channels including one or more interferer channels.

Figure 11:
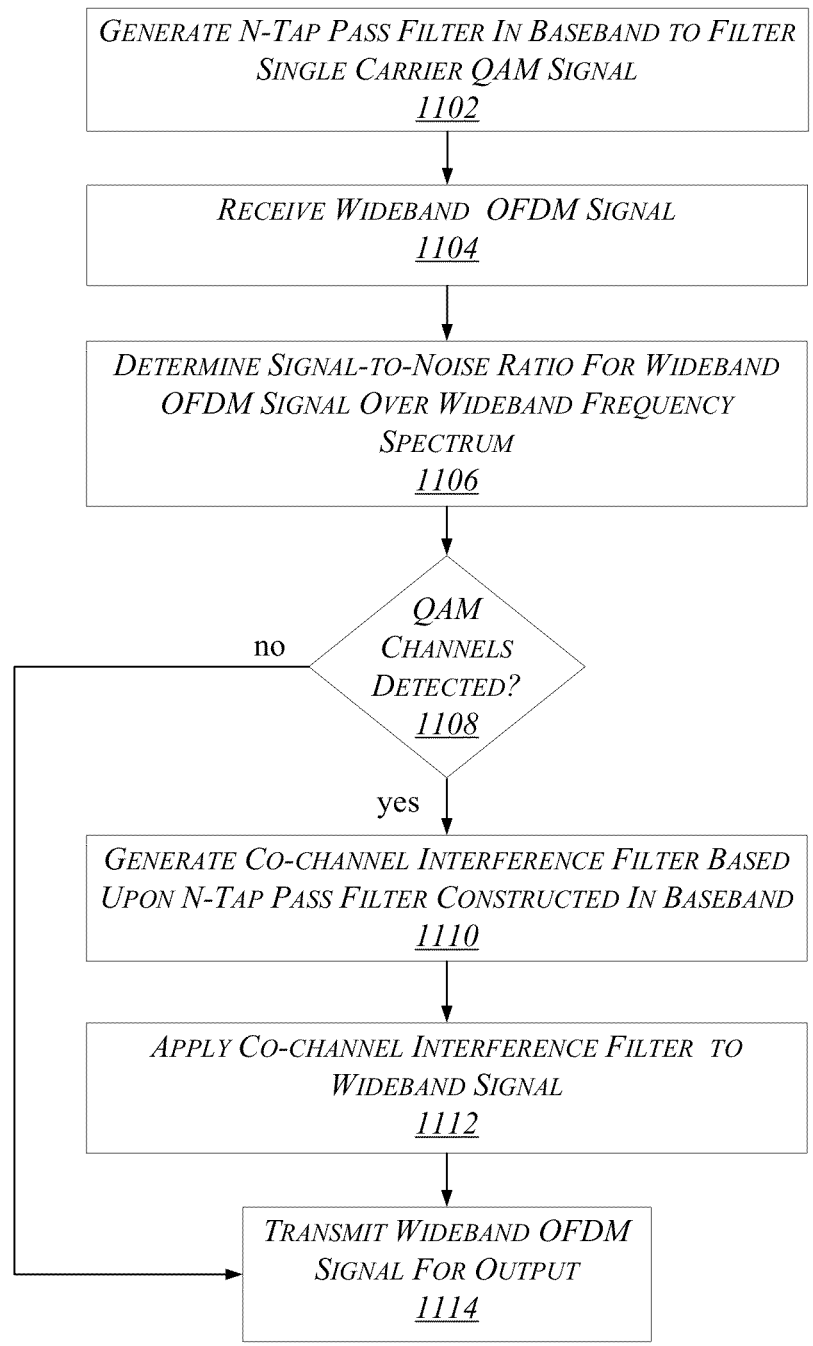
FIG. 11 shows an exemplary second logic flow.

FIG. 11 depicts an exemplary second logic flow 1100. At block 1102 an N-tap filter is generated in a baseband to filter single carrier QAM signal. At block 1104, a wideband OFDM signal is received. In some instances the wideband OFDM signal may include one or more interferers distributed in one or more interferer channels.

At block 1106, the signal-to-noise ratio is determined for the wideband OFDM signal over a wideband frequency spectrum. At block 1108, a determination is made as to whether QAM channels have been detected. If so, the flow then proceeds to block 1110.

At the block 1110 a co-channel interference filter is generated based upon the N-tap pass filter constructed. The co-channel interference filter may represent a stop band filter that exhibits a series of stop bands characteristic of the determined QAM channels. The stop bands may be constructed by subtracting from a unity filter a pass filter that is constructed from the N-tap baseband filter.

At block 1112, the CCI filter is applied to the wideband signal including the OFDM carriers and QAM channels. The flow then proceeds to block 1114. If, at block 1108, no QAM channels are detected, the flow proceeds directly to block 1114. At block 1114, the wideband OFDM signal is transmitted for output.

Figure 12:
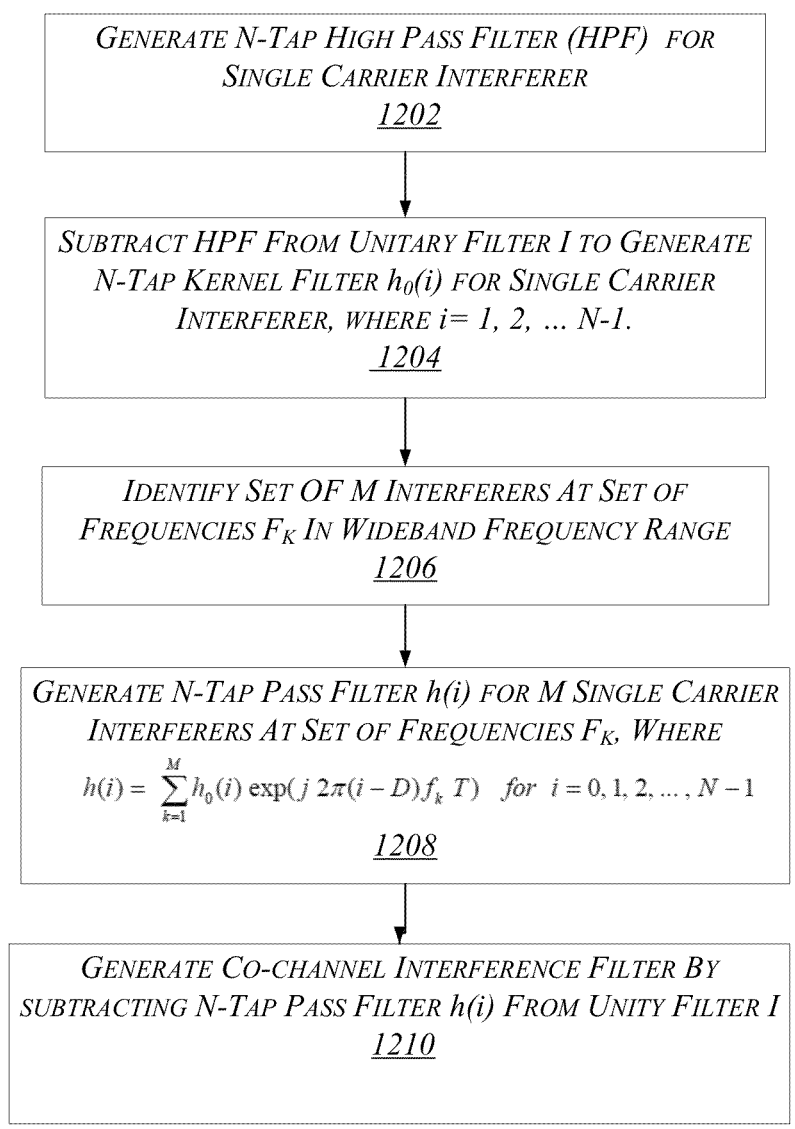
FIG. 12 shows and exemplary third logic flow.

FIG. 12 depicts an exemplary third logic flow 1200. At block 1202 an N-tap high pass filter (HPF) is generated for a single carrier interferer. At block 1204, the high pass filter is subtracted from a unitary filter I to generate an N-tap kernel filter $h_0(i)$ for a single carrier interferer, where $i=1, 2, \ldots N-1$.

At the block 1206, a set of M interferers is identified at a set of frequencies $F_K$ in a wideband frequency range. At block 1208 an N-tap pass filter h(i) for M single carrier interferer channels distributed at the set of frequencies $F_K$, where $$h(i) = \sum_{k=1}^{M} h_0(i) \exp(j2\pi(i-D)f_k T) \text{ for } i = 0, 1, 2, \ldots, N-1$$

At block 1210 a co-channel interference filter is generated by subtracting the N-tap pass filter h(i) from a unity filter.

Figure 13:
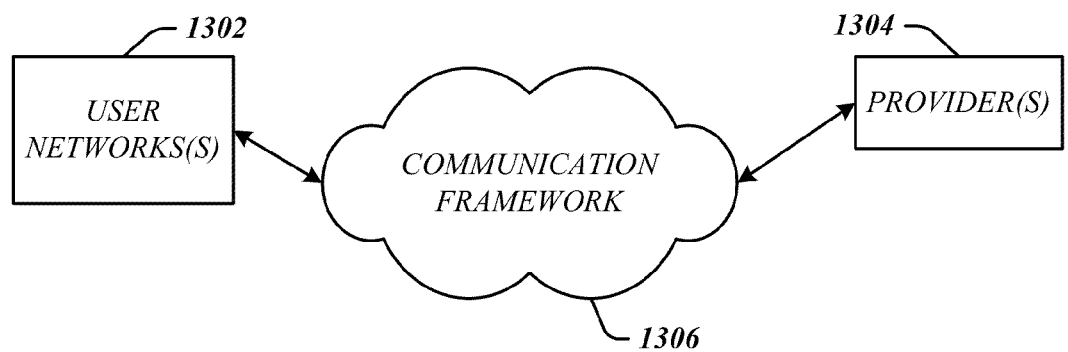
FIG. 13 illustrates an exemplary system architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, and so forth. The embodiments, however, are not limited to implementation by the communications architecture 1200.

As shown in FIG. 13, the communications architecture 1300 comprises includes one or more user networks 1302 and providers 1304.

The user networks 1302 and the providers 1304 may communicate information between each other using a communication framework 1306. The communications framework 1306 may implement any well-known communications techniques and protocols, such as those described with reference to system 100. The communications framework 1306 may be implemented over a combination of wired and wireless links as a packet-switched network, a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a processor circuit and a dynamic filter adjustment component for execution on the processor to identify in a wideband communications signal a set of one or more interferer frequencies for one or more respective interferer channels of a set of communications channels to be filtered, to select a kernel filter comprising a low pass filter having a channel width corresponding to a channel of the one or more interferer channels, and to generate a co-channel interference (CCI) filter to stop the one or more interferer channels by inverting the kernel filter.

In a further embodiment, the dynamic filter adjustment component for execution on the processor circuit to generate one or more N-tap filters by frequency shifting the kernel filter to the one or more frequency ranges, to form an interferer pass filter by summing the one or more N-tap filters, to subtract the pass filter from a unitary filter I to form the CCI filter; and to apply the CCI filter to the wideband signal.

Alternatively, or in addition, in a further embodiment the dynamic filter adjustment component may be for execution on the processor circuit to generate the kernel filter (KF) by generating a high pass filter HPF in a baseband region, and by subtracting the high pass filter from a unitary filter I, wherein KF is given by I-HPF.

Alternatively, or in addition, in a further embodiment the interferer pass filter may comprise an N-tap filter h(i) and may be determined by:

$$h(i) = \sum_{k=1}^{M} h_0(i) \exp(j2\pi(i-D)f_k T) \text{ for } i = 0, 1, 2, \ldots, N-1$$

where M is the number of interferer channels, $f_k$ is the frequency of each interferer, D is filter group delay in samples, and T is the sampling interval.

Alternatively, or in addition, in a further embodiment, the dynamic filter adjustment component may be for execution on the processor circuit to filter input (INPUT) of the wideband signal to produce a filtered output signal (OUTPUT) given by $$[\text{Output}] = \left[ I - \sum_{k=1}^{M} (I - HPF)_{frequency\_shift(k)} \right] [\text{Input}]$$

where M is the number of interferer channels.

Alternatively, or in addition, in a further embodiment, the dynamic filter adjustment component may be for execution on the processor circuit to prestore the kernel filter in memory.

Alternatively, or in addition, in a further embodiment, the dynamic filter adjustment component may be for execution on the processor circuit to measure spectral location of the one or more interferer frequencies when the wideband communication signal is received, and to determine filter coefficients for the CCI filter based upon spectral location of the one or more interferer frequencies.

Alternatively, or in addition, in a further embodiment, the dynamic filter adjustment component may be for execution on the processor circuit to measure signal-to-noise ratio (SNR) over at least a portion of a frequency range spanned by the wideband frequency range.

Alternatively, or in addition, in a further embodiment, the dynamic filter adjustment component may be for execution on the processor circuit to select two or more prestored kernel filters having a combined bandwidth equal to the channel width of the one or more interferer channels, shift frequency of the two or more prestored kernel filters to form two or more shifted kernel filters, and add the two or more shifted kernel filters to form the kernel filter.

Alternatively, or in addition, in a further embodiment, the apparatus may comprise a receiver to receive the wideband communications signal comprising a quadrature amplitude modulation signal and orthogonal frequency division multiplexing signal.

In another embodiment, a computer implemented method may include identifying in a wideband communications signal a set of one or more interferer frequencies for one or more respective interferer channels of a set of communications channels to be filtered, selecting a kernel filter comprising a low pass filter having a channel width corresponding to a channel of the one or more interferer channels, and generating a co-channel interference (CCI) filter to stop the one or more interferer channels by inverting the kernel filter.

In a further embodiment, the method may include generating one or more N-tap filters by frequency shifting the kernel filter to the one or more frequency ranges, forming an interferer pass filter by summing the one or more N-tap filters, subtracting the pass filter from a unitary filter I to form the CCI filter; and applying the CCI filter to the wideband signal.

Alternatively, or in addition, in a further embodiment the method may include generating the kernel filter (KF) by generating a high pass filter HPF in a baseband region, and subtracting the high pass filter from a unitary filter I, wherein KF is given by I-HPF.

Alternatively, or in addition, in a further embodiment the interferer pass filter may comprise an N-tap filter h(i) and the method may include determining h(i) by:

$$h(i) = \sum_{k=1}^{M} h_0(i) \exp(j2\pi(i-D)f_k T) \text{ for } i = 0, 1, 2, \ldots, N-1$$

where M is the number of interferer channels, $f_k$ is the frequency of each interferer, D is filter group delay in samples, and T is the sampling interval.

Alternatively, or in addition, in a further embodiment, the method may include filtering input (INPUT) of the wideband signal to produce a filtered output signal (OUTPUT) given by $$[\text{Output}] = \left[ I - \sum_{k=1}^{M} (I - HPF)_{\text{frequency\_shift}(k)} \right] [\text{Input}]$$

where M is the number of interferer channels.

Alternatively, or in addition, in a further embodiment, the method may comprise prestoring the kernel filter in memory.

Alternatively, or in addition, in a further embodiment, the method may include measuring spectral location of the one or more interferer frequencies when the wideband communication signal is received, and determining filter coefficients for the CCI filter based upon spectral location of the one or more interferer frequencies.

Alternatively, or in addition, in a further embodiment, the method may include measuring signal-to-noise ratio (SNR) over at least a portion of a frequency range spanned by the wideband frequency range.

Alternatively, or in addition, in a further embodiment, the method may include selecting two or more prestored kernel filters having a combined bandwidth equal to the channel width of the one or more interferer channels, shifting frequency of the two or more prestored kernel filters to form two or more shifted kernel filters, and adding the two or more shifted kernel filters to form the kernel filter.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

What is claimed is:

1. An apparatus, comprising:
a processor circuit; and
a dynamic filter adjustment component for execution on the processor to:
identify in a wideband communications signal a set of one or more interferer frequencies for one or more respective interferer channels of a set of communications channels to be filtered;
select a kernel filter comprising a low pass filter having a channel width corresponding to a channel of the one or more interferer channels; and
generate a co-channel interference (CCI) filter to stop the one or more interferer channels by inverting the kernel filter.

2. The apparatus of claim 1, the dynamic filter adjustment component for execution on the processor circuit to:
generate one or more N-tap filters by frequency shifting the kernel filter to the one or more interferer frequencies;
form an interferer pass filter by summing the one or more N-tap filters;
subtract the interferer pass filter from a unitary filter I to form the CCI filter; and
apply the CCI filter to the wideband signal.

3. The apparatus of claim 1, the dynamic filter adjustment component for execution on the processor circuit to generate the kernel filter (KF) by:
generating a high pass filter HPF in a baseband region; and
subtracting the high pass filter from a unitary filter I, wherein KF is given by I-HPF.

4. The apparatus of claim 2, the interferer pass filter comprising an N-tap filter h(i) and being determined by:

$$h(i) = \sum_{k=1}^{M} h_0(i) \exp(j2\pi(i-D)f_k T) \text{ for } i = 0, 1, 2, \ldots, N-1$$

where M is the number of interferer channels, $f_k$ is the center frequency of each interferer, D is filter group delay in samples, and T is the sampling interval.

5. The apparatus of claim 3, the dynamic filter adjustment component for execution on the processor circuit to filter input (INPUT) of the wideband signal to produce a filtered output signal (OUTPUT) given by $$[\text{Output}] = \left[ I - \sum_{k=1}^{M} (I - HPF)_{frequency\_shift(k)} \right] [\text{Input}]$$

where M is the number of interferer channels.

6. The apparatus of claim 1, the dynamic filter adjustment component for execution on the processor circuit to prestore the kernel filter in memory.

7. The apparatus of claim 1, the dynamic filter adjustment component for execution on the processor circuit to:
measure spectral location of the one or more interferer frequencies when the wideband communication signal is received; and
determine filter coefficients for the CCI filter based upon spectral location of the one or more interferer frequencies.

8. The apparatus of claim 1, the dynamic filter adjustment component for execution on the processor circuit to measure signal-to-noise ratio (SNR) over at least a portion of a frequency range spanned by the wideband frequency range.

9. The apparatus of claim 1, the kernel filter comprising a product kernel filter generated from two or more prestored kernel filters, the dynamic filter adjustment component for execution on the processor circuit to select the kernel filter by:
selecting two or more prestored kernel filters having a combined bandwidth equal to the channel width of the one or more interferer channels;

shifting frequency of the two or more prestored kernel filters to form two or more shifted kernel filters; and
adding the two or more shifted kernel filters.

10. The apparatus of claim 1, comprising a cable connector to receive the wideband communications signal comprising a quadrature amplitude modulation signal and orthogonal frequency division multiplexing signal.

11. At least one non-transitory computer-readable storage medium comprising instructions that, when executed, cause a system to:
identify in a wideband communications signal a set of one or more interferer frequencies for one or more respective interferer channels of a set of communications channels to be filtered;
select a kernel filter comprising a low pass filter having a channel width corresponding to a channel of the one or more interferer channels;
generate a co-channel interference (CCI) filter to stop the one or more interferer channels by inverting the kernel filter.

12. The at least one non-transitory computer-readable storage medium of claim 11 comprising instructions that, when executed, cause the system to:
generate one or more N-tap filters by frequency shifting the kernel filter to the one or more frequency ranges;
form an interferer pass filter by summing the one or more N-tap filters;
subtract the pass filter from a unitary filter I to form the CCI filter; and
apply the CCI filter to the wideband signal;
subtract the interferer pass filter from a unitary filter I to form the CCI filter; and
apply the CCI filter to the wideband signal.

13. The at least one non-transitory computer-readable storage medium of claim 11 comprising instructions that, when executed, cause the system to generate the kernel filter (KF) by:
generating a high pass filter HPF in a baseband region; and
subtracting the high pass filter from a unitary filter I, wherein KF is given by I-HPF.

14. The at least one non-transitory computer-readable storage medium of claim 13 comprising instructions that, when executed, cause the system to generate the interferer pass filter as an N-tap filter h(i) and being determined by:

$$h(i) = \sum_{k=1}^{M} h_0(i) \exp(j2\pi(i-D)f_k T) \text{ for } i = 0, 1, 2, \ldots, N-1$$

where M is the number of interferer channels, $f_k$ is the frequency of each interferer, D is filter group delay in samples, and T is the sampling interval.

15. The at least one non-transitory computer-readable storage medium of claim 13 comprising instructions that, when executed, cause the system to filter input (INPUT) of the wideband signal to produce a filtered output signal (OUTPUT) given by $$[\text{Output}] = \left[ I - \sum_{k=1}^{M} (I - HPF)_{frequency\_shift(k)} \right] [\text{Input}]$$

where M is the number of interferer channels.

16. The at least one non-transitory computer-readable storage medium of claim 11 comprising instructions that, when executed, cause the system to prestore the kernel filter in memory.

17. The at least one non-transitory computer-readable storage medium of claim 11 comprising instructions that, when executed, cause the system to:
measure spectral location of the one or more interferer frequencies when the wideband communication signal is received; and
determine filter coefficients for the CCI filter based upon spectral location of the one or more interferer frequencies.

18. The at least one non-transitory computer-readable storage medium of claim 11 comprising instructions that, when executed, cause the system to measure signal-to-noise ratio (SNR) over at least a portion of a frequency range spanned by the wideband frequency range.

19. The at least one non-transitory computer-readable storage medium of claim 11 comprising instructions that, when executed, cause the system to select the kernel filter by:
selecting two or more prestored kernel filters having a combined bandwidth equal to the channel width of the one or more interferer channels;
shifting frequency of the two or more prestored kernel filters to form two or more shifted kernel filters; and
adding the two or more shifted kernel filters to form the kernel filter.

20. A computer implemented method, comprising:
identifying in a wideband communications signal a set of one or more interferer frequencies for one or more respective interferer channels of a set of communications channels to be filtered;
selecting a kernel filter comprising a low pass filter having a channel width corresponding to a channel of the one or more interferer channels; and
generating a co-channel interference (CCI) filter to stop the one or more interferer channels by inverting the kernel filter.

21. The computer implemented method of claim 20, comprising:
generating one or more N-tap filters by frequency shifting the kernel filter to the one or more frequency ranges;
forming an interferer pass filter by summing the one or more N-tap filters;
subtracting the pass filter from a unitary filter I to form the CCI filter; and
applying the CCI filter to the wideband signal.

22. The computer implemented method of claim 20, the generating the kernel filter (KF) comprising:
generating a high pass filter HPF in a baseband region; and
subtracting the high pass filter from a unitary filter I, wherein KF is given by I-HPF.

23. The computer implemented method of claim 22, the interferer pass filter comprising an N-tap filter h(i) and being determined by:

$$h(i) = \sum_{k=1}^{M} h_0(i) \exp(j2\pi(i-D)f_k T) \text{ for } i = 0, 1, 2, \ldots, N-1$$

where M is the number of interferer channels, $f_k$ is the frequency of each interferer, D is filter group delay in samples, and T is the sampling interval.

24. The computer implemented method of claim 22, comprising filtering input (INPUT) of the wideband signal to produce a filtered output signal (OUTPUT) given by $$[Output] = \left[ I - \sum_{k=1}^{M} (I - HPF)_{frequency\_shift(k)} \right] [Input]$$

where M is the number of interferer channels.

25. The computer implemented method of claim 20, comprising prestoring the kernel filter in memory.

26. The computer implemented method of claim 20, comprising:
measuring spectral location of the one or more interferer frequencies when the wideband communication signal is received; and
determining filter coefficients for the CCI filter based upon spectral location of the one or more interferer frequencies.

27. The computer implemented method of claim 20, comprising measuring signal-to-noise ratio (SNR) over at least a portion of a frequency range spanned by the wideband frequency range.

28. The computer implemented method of claim 20, the selecting the kernel filter comprising:
selecting two or more prestored kernel filters having a combined bandwidth equal to the channel width of the one or more interferer channels;
shifting frequency of the two or more prestored kernel filters to form two or more shifted kernel filters; and
adding the two or more shifted kernel filters to form the kernel filter.

* * * * *

UNITED STATES PATENT AND TRADEMARK OFFICE
CERTIFICATE OF CORRECTION

PATENT NO.        : 8,938,041 B2                              Page 1 of 1
APPLICATION NO.   : 13/718812
DATED             : January 20, 2015
INVENTOR(S)       : Bernard Arambepola et al.

It is certified that error appears in the above-identified patent and that said Letters Patent is hereby corrected as shown below:

In The Drawings

On sheet 8 of 11, in Figure 10, reference numeral 1002, line 3, delete "INTEFERER" and insert -- INTERFERER --, therefor.

Signed and Sealed this
Seventeenth Day of May, 2016

Michelle K. Lee
*Director of the United States Patent and Trademark Office*